United States Patent
Chen et al.

(10) Patent No.: US 10,649,735 B2
(45) Date of Patent: May 12, 2020

(54) SECURITY SYSTEM WITH ENTROPY BITS

(71) Applicant: eMemory Technology Inc., Hsin-Chu (TW)

(72) Inventors: Hsin-Ming Chen, Hsinchu (TW); Meng-Yi Wu, Hsinchu (TW); Po-Hao Huang, Hsinchu (TW)

(73) Assignee: eMemory Technology Inc., Hsin-Chu (TW)

( * ) Notice: Subject to any disclaimer, the term of this patent is extended or adjusted under 35 U.S.C. 154(b) by 250 days.

(21) Appl. No.: 15/915,074

(22) Filed: Mar. 8, 2018

(65) Prior Publication Data

US 2019/0081804 A1 Mar. 14, 2019

Related U.S. Application Data

(60) Provisional application No. 62/557,170, filed on Sep. 12, 2017.

(51) Int. Cl.
*G06F 21/00* (2013.01)
*G06F 7/58* (2006.01)
(Continued)

(52) U.S. Cl.
CPC .............. *G06F 7/588* (2013.01); *G06F 21/86* (2013.01); *G09C 1/00* (2013.01); *G11C 7/062* (2013.01); *G11C 17/16* (2013.01); *G11C 17/18* (2013.01); *H01L 27/11206* (2013.01); *H03K 3/84* (2013.01); *H04L 9/0866* (2013.01);
(Continued)

(58) Field of Classification Search
None
See application file for complete search history.

(56) References Cited

U.S. PATENT DOCUMENTS 8,938,792 B2    1/2015 Koeberl
9,390,291 B2 *  7/2016 Cox ...................... G06F 21/52
(Continued)

FOREIGN PATENT DOCUMENTS

CN     104838385 A    8/2015
CN     106020771 A    10/2016
(Continued)

OTHER PUBLICATIONS

Karpinskyy, Bohdan et al. 8.7 Physically Unclonable Function for Secure Key Generation with a Key Error Rate of 2E-38 in 45nm Smart-Card Chips. 2016 IEEE International Solid-State Circuits Conference (ISSCC). https://ieeexplore.ieee.org/stamp/stamp.jsp?tp=&arnumber=7417955 (Year: 2016).*
(Continued)

*Primary Examiner* — Jeremiah L Avery
(74) *Attorney, Agent, or Firm* — Winston Hsu

(57) ABSTRACT

A security system with entropy bits includes a physically unclonable function circuit, and a security key generator. The physically unclonable function circuit provides a plurality of entropy bit strings. The security key generator generates a security key by manipulating a manipulation bit string derived from the plurality of entropy bit strings according to an operation entropy bit string. Each bit of the operation entropy bit string is used to determine whether to perform a corresponding operation to the manipulation bit string.

33 Claims, 7 Drawing Sheets

(51) Int. Cl.
*H04L 9/32* (2006.01)
*G11C 7/06* (2006.01)
*G11C 17/16* (2006.01)
*G06F 21/86* (2013.01)
*H04L 9/08* (2006.01)
*G09C 1/00* (2006.01)
*H03K 3/84* (2006.01)
*G11C 17/18* (2006.01)
*H01L 27/112* (2006.01)
*H03K 19/21* (2006.01)

(52) U.S. Cl.
CPC .......... *H04L 9/0869* (2013.01); *H04L 9/3278* (2013.01); *H03K 19/21* (2013.01); *H04L 2209/12* (2013.01)

(56) References Cited

U.S. PATENT DOCUMENTS

| | | | |
|---|---|---|---|
| 9,613,714 | B1 | 4/2017 | Wong |
| 2013/0246881 | A1 | 9/2013 | Goettfert |
| 2014/0091832 | A1* | 4/2014 | Gotze .................. H03K 19/003 326/8 |
| 2014/0189365 | A1* | 7/2014 | Cox ........................ G06F 21/73 713/189 |
| 2015/0355886 | A1* | 12/2015 | Peeters ................... G06F 7/588 708/250 |
| 2016/0087805 | A1 | 3/2016 | Li |
| 2016/0140357 | A1* | 5/2016 | Newell ................... G06F 21/79 726/2 |
| 2016/0170856 | A1 | 6/2016 | Kim |

FOREIGN PATENT DOCUMENTS

| | | |
|---|---|---|
| JP | 2003-198529 A | 7/2003 |
| JP | 2017-130184 A | 7/2017 |
| TW | 201721407 A | 6/2017 |
| WO | 2013/101085 A1 | 7/2013 |
| WO | 2016/058793 A1 | 4/2016 |
| WO | 2016/102164 A1 | 6/2016 |
| WO | 2017/021254 A1 | 2/2017 |
| WO | 2017/025597 A1 | 2/2017 |

OTHER PUBLICATIONS

Tehranipoor, Fatemeh et al. DRAM-Based Intrinsic Physically Unclonable Functions for System-Level Security and Authentication. IEEE Transactions on Very Large Scale Integration (VLSI) Systems, vol. 25, Issue: 3. https://ieeexplore.ieee.org/stamp/stamp.jsp?tp=&arnumber=7579621 (Year: 2017).*

Lin, Chen et al. Information Security Solution Decision-making Based on Entropy Weight and Gray Situation Decision. 2009 Fifth International Conference on Information Assurance and Security. https://ieeexplore.ieee.org/stamp/stamp.jsp?tp=&arnumber=5283530 (Year: 2009).*

Koeberl, Patrick et al. Entropy Loss in PUF-based Key Generation Schemes: The Repetition Code Pitfall. 2014 IEEE International Symposium on Hardware-Oriented Security and Trust (HOST). https://ieeexplore.ieee.org/stamp/stamp.jsp?tp=&arnumber=6855566 (Year: 2014).*

Edman, Matthew et al. On the Security of Key Extraction from Measuring Physical Quantities. IEEE Transactions on Information Forensics and Security, vol. 11, Issue: 8. https://ieeexplore.ieee.org/stamp/stamp.jsp?tp=&arnumber=7435287 (Year: 2016).*

Teng Xu et al., Secure Remote Sensing and Communication using Digital PUFs, Oct. 20, 2014, USA, pp. 173-184, XP058058874.

Rick Shih-Jye Shen et al., A High-Density Logic CMOS Process Compatible Non-Volatile Memory for Sub-28nm Technologies, 2014 Symposium on VLSI Technology Digest of Technical Papers, 2014 IEEE, USA, XP032640168.

* cited by examiner

|    | [0] | [1] | [2] | [3] | [4] | [5] | [6] | [7] |
|----|-----|-----|-----|-----|-----|-----|-----|-----|
| S1 | (0) | 1   | 1   | 0   | (1) | 0   | 1   | 0   |
| S2 | 1   | (0) | 1   | 1   | 0   | (1) | 0   | 1   |
| S3 | 1   | 1   | (1) | 0   | 1   | 0   | (0) | 1   |
| S4 | 0   | 1   | 0   | (0) | 1   | 0   | 1   | (0) |
| S5 | 1   | 0   | 0   | 1   | 0   | 1   | 1   | 0   |
| S6 | 0   | 1   | 1   | 0   | 1   | 1   | 0   | 1   |

FIG. 3

SECURITY SYSTEM WITH ENTROPY BITS

CROSS REFERENCE TO RELATED APPLICATIONS

This non-provisional application claims priority of U.S. provisional application U.S. 62/557,170, filed on Sep. 12, 2017, included herein by reference in its entirety.

BACKGROUND OF THE INVENTION

1. Field of the Invention

This invention is related to a security system, and more particularly, to a security system with entropy bits.

2. Description of the Prior Art

As electronic devices are applied to more and more fields, the information processed by the electronic devices also increases. Sometimes, the electronic device may perform functions involving sensitive information. In this case, a unique security key of the electronic device may be used for identification and protection. However, since reverse engineering methods of chips and devices become automatable, physical and side-channel attacks have become much more affordable and powerful. Therefore, the issues of exposure of sensitive information have raised great concerns.

To prevent devices from being accessed by unauthorized people, a significant amount of money and time are usually required for developing countermeasures to safeguard against adversaries. In prior art, the integrated circuit physical unclonable function (PUF) may be applied for protecting the system from physical attacks and for raising the barrier for reverse engineering or system hacking due to its intrinsic characteristics.

The PUF can establish a bit string pattern due to uncontrollable random physical characteristics generated in the manufacturing process. The process variations can come from very small changes in process control, material contents, and/or environmental drift. These unavoidable and unpredictable variations are amplified by the PUFs for generating unique bit strings.

However, comparing to the number of unique bits required by the system, for example, the system initialization vectors and encrypted communications, the system may not be able to include enough amounts of PUFs due to the limitation of cost and area. Furthermore, since the bit strings generated by PUFs are uncontrollable, the quality and randomness of the bit strings are uncontrollable as well. Therefore, how to use PUFs for optimizing system security remains an issue to be solved.

SUMMARY OF THE INVENTION

One embodiment of the present invention discloses a security system with entropy bits. The security system includes a physically unclonable function circuit, and a security key generator.

The physically unclonable function circuit provides a plurality of entropy bit strings. The security key generator generates a security key by manipulating a manipulation bit string derived from the plurality of entropy bit strings according to an operation entropy bit string. Each bit of the operation entropy bit string is used to determine whether to perform a corresponding operation to the manipulation bit string. Another embodiment of the present invention discloses a method for operating a security system with entropy bits. The security system includes a physically unclonable function circuit and a security key generator.

The method includes the physically unclonable function circuit providing a plurality of entropy bit strings, deriving a manipulation bit string from the plurality of entropy bit strings, and the security key generator generating a security key by manipulating the manipulation bit string according to an operation entropy bit string. Each bit of the operation entropy bit string is configured to determine whether to perform a corresponding operation to the manipulation bit string.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows some of the entropy bit strings provided by the PUF circuit in FIG. 1 according to one embodiment of the present invention.

DETAILED DESCRIPTION

Figure 1:
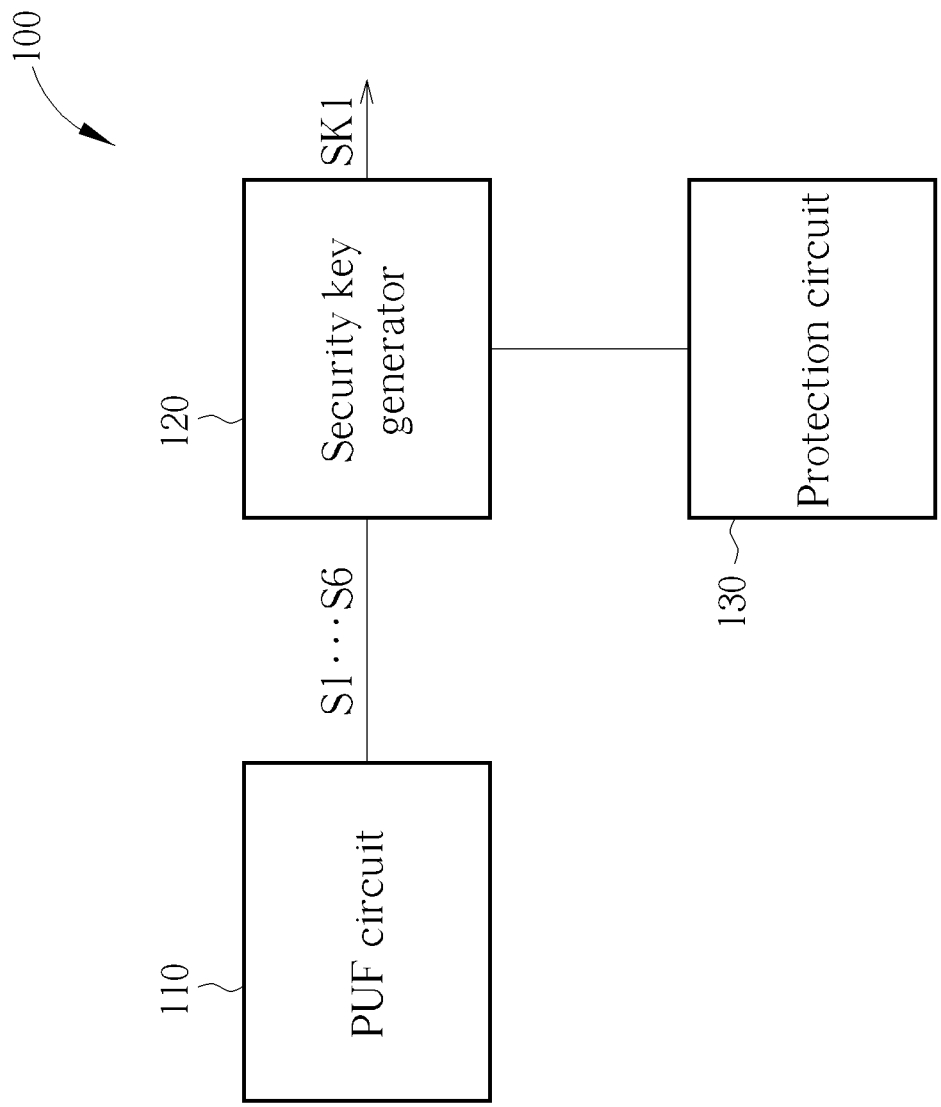
FIG. 1 shows a security system according to one embodiment of the present invention.

FIG. 1 shows a security system 100 according to one embodiment of the present invention. The security system 100 includes a physically unclonable function (PUF) circuit 110, and a security key generator 120.

Figure 2:
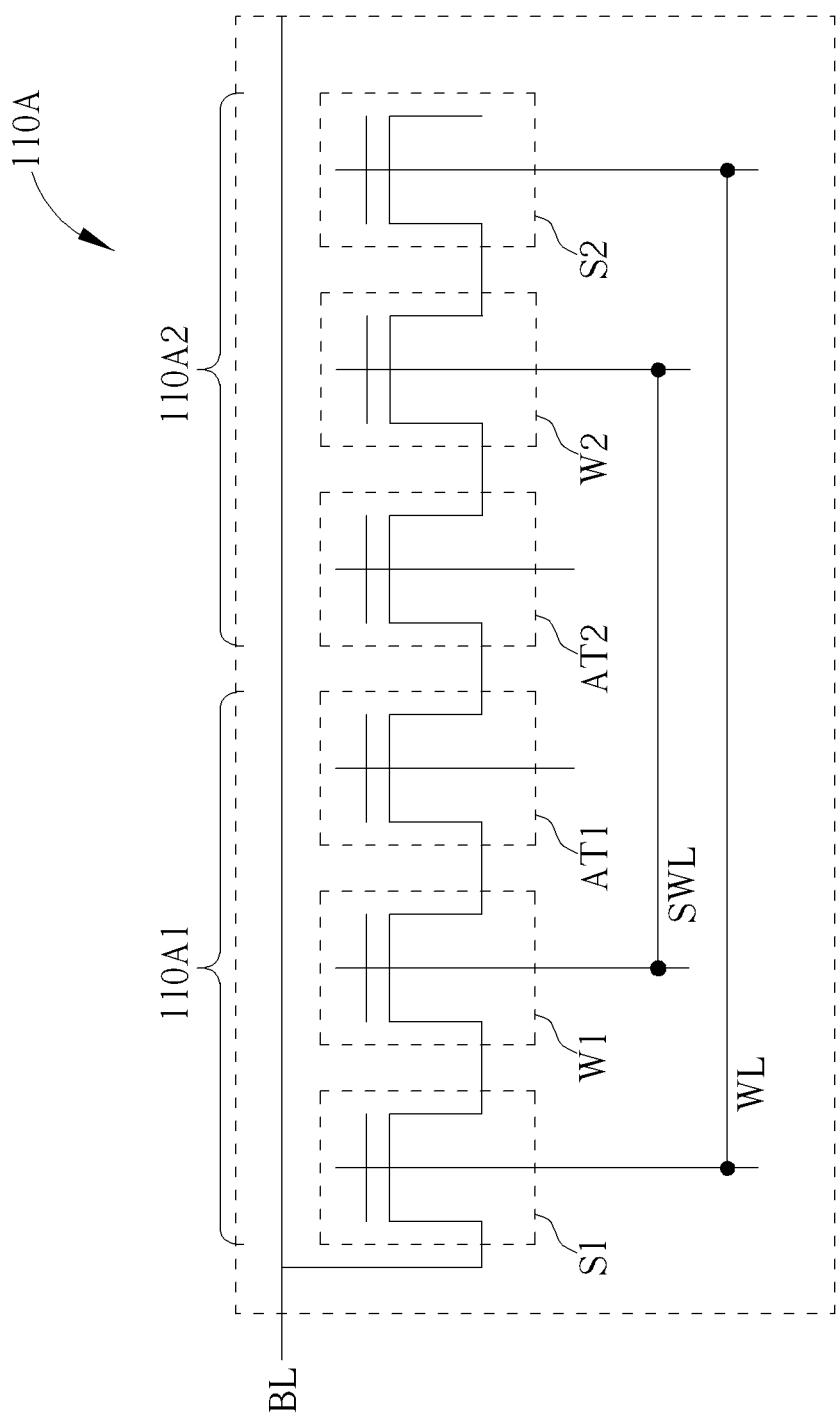
FIG. 2 shows a PUF unit of the PUF circuit in FIG. 1 according to one embodiment of the present invention.

The PUF circuit 110 can include a plurality of PUF units and can provide a plurality of entropy bit strings. For example, FIG. 2 shows a PUF unit 110A of the PUF circuit 110 according to one embodiment of the present invention. The PUF unit 110A includes two one-time programmable (OTP) memory cells 110A1 and 110A2. The OTP memory cell 110A1 includes an antifuse transistor AT1, a decoupling transistor W1, and a selection transistor S1. The OTP memory cell 110A2 includes an antifuse transistor AT2, a decoupling transistor W2, and a selection transistor S2. The selection transistor S1 has a first terminal coupled to a bit line BL, a second terminal, and a control terminal coupled to a word line WL. The first decoupling transistor W1 has a first terminal coupled to the second terminal of the first selection transistor S1, a second terminal, and a control terminal coupled to a control line SWL. The first antifuse transistor AT1 has a first terminal coupled to the second terminal of the first decoupling transistor W1, a second terminal, and a gate structure. Also, the second selection transistor S2 has a first terminal coupled to the bit line BL, a second terminal, and a control terminal coupled to the word line WL. The second decoupling transistor W2 has a first terminal coupled to the second terminal of the second selection transistor S2, a second terminal, and a control terminal coupled to the control line SWL. The antifuse transistor AT2 has a first terminal coupled to the second terminal of the second decoupling transistor W2, a second terminal coupled to the second terminal of the first antifuse transistor AT1, and a gate structure. That is, the antifuse transistors AT1 and AT2 are coupled together, the decoupling transistors W1 and W2 are controlled by the same control line SWL, and the selection transistors S1 and S2 are controlled by the same word line WL.

When programming the PUF unit 110A, the program operation is performed to the OTP memory cell 110A1 and the OTP memory cell 110A2 concurrently. During the program operation, the gate structures of the antifuse transistors AT1 and AT2 would receive the same high program voltages concurrently and the source/drain terminals of the antifuse transistors AT1 and AT2 would receive a low voltage through the decoupling transistors W1 and W2 and the selection transistors S1 and S2. In this case, one of the antifuse transistors AT1 and AT2 would be ruptured first due to the different intrinsic characteristics caused by manufacturing variations of the OTP memory cell 110A1 and the OTP memory cell 110A2, such as gate oxide quality, local defects, gate oxide thinning, etc. Also, the OTP memory being ruptured first would prevent the other antifuse transistor from being ruptured. That is, normally, only one of the antifuse transistors AT1 and AT2 will be ruptured during the programming process.

Therefore, after being programmed, the gate conditions of the antifuse transistors AT1 and AT2 should be different from each other, and can be read through the decoupling transistors W1 and W2 and the selection transistors S1 and S2 by applying the same reading voltages to the gate structures of the antifuse transistor AT1 and AT2 separately. Since the gate conditions of the antifuse transistors AT1 and AT2 are caused by uncontrollable manufacturing variations, the bits read from the OTP memory cells 110A1 and 110A2 are unpredictable, and thus, can be used as entropy bits required by the system.

With the required number of PUF units 110A, the PUF circuit 110 can generate the desired amount of entropy bit strings. However, the PUF unit 110A shown in FIG. 2 is an exemplary case. In other embodiments, the PUF units of the PUF circuit 110 can be implemented with different structures. For example, the PUF unit 110A may omit the decoupling transistors W1 and W2, and use the selection transistors S1 and S2 for operation selection. That is, the second terminal of the selection transistor S1 can be directly coupled to the first terminal of the antifuse transistor AT1 and the second terminal of the selection transistor S2 can be directly coupled to first terminal of the antifuse transistor AT2.

Moreover, in some embodiments, the selection transistors S1 and S2 may also be omitted. In this case, the first terminals of the antifuse transistors AT1 and AT2 would be coupled to the bit line BL directly. Also, the portion of the gate structure adjacent to the first terminal of the antifuse transistor AT1 would have thicker gate oxide than the portion of the gate structure adjacent to the second terminal of the antifuse transistor AT1, and a portion of the gate structure adjacent to the first terminal of the antifuse transistor AT2 would have thicker gate oxide than a portion of the gate structure adjacent to the second terminal of the antifuse transistor AT2. That is, the thickness of the gate oxides of the antifuse transistors AT1 and AT2 are not evenly distributed. In this case, the first terminals of the antifuse transistors AT1 and AT2 are used for operation selection while the second terminals of the antifuse transistors AT1 and AT2 may be ruptured during the programming process. Therefore, the selection transistors S1 and S2 may not be required in this case.

Since the access of the raw data of the entropy bit strings provided by the PUF circuit 110 may be rather straight forward, the security key generator 120 can generate a desired security key SK1 by manipulating the entropy bit strings provided by the PUF circuit 110 to further complicate and randomize the process and the result. The security key SK1 can be used in many fields when at least one of a unique string, an initial vector, a padding or a nonce (the number used once) is needed.

FIG. 3 shows some of the entropy bit strings S1 to S6 provided by the PUF circuit 110 according to one embodiment of the present invention. The security key generator 120 can generate the security key SK1 by manipulating a manipulation bit string derived from the entropy bit strings provided by the PUF circuit 110 according to an operation entropy bit string also provided by the PUF circuit 110. That is, the manipulating bit string is used for generating the security key by being manipulated, and the operation entropy bit string is used for deciding how to manipulate the manipulating bit string.

Figure 4:
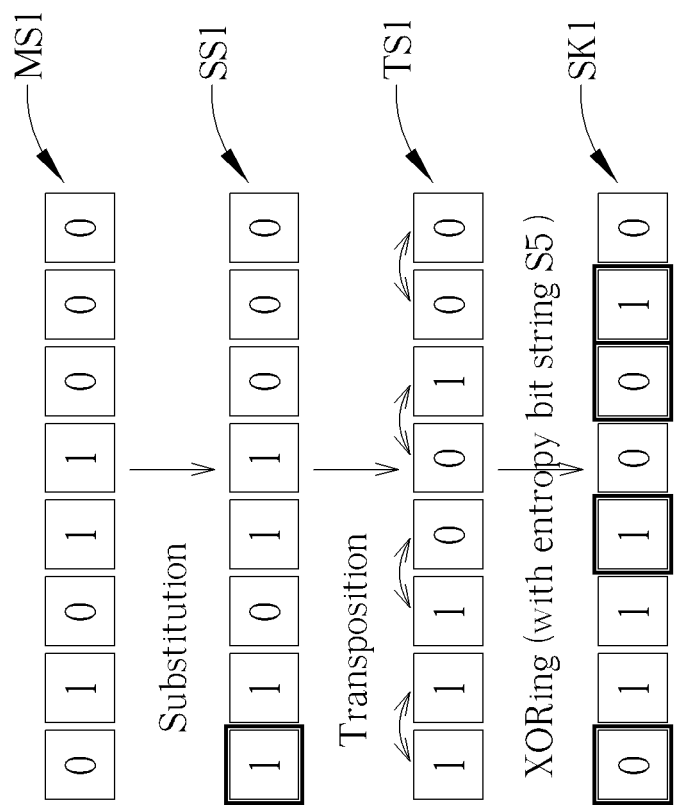
FIG. 4 shows the manipulating process of a manipulation bit string for generating the security key according to one embodiment of the present invention.

FIG. 4 shows the manipulating process of a manipulation bit string MS1 for generating the security key SK1 according to one embodiment of the present invention.

In some embodiments, the manipulation bit string MS1 can be derived from different entropy bit strings according to a predetermined order. For example, in FIG. 3, the manipulation entropy string MS1 may combine some of the bits from four different strings S1 to S4 in a predetermined order. In this case, the manipulation entropy string MS1 with its value of "01011000" as shown in FIG. 4 can be derived by combining bits S1[0] and S1[4] from the entropy bit string S1, bits S2[1] and S2[5] from the entropy bit string S2, bits S3[2] and S3[6] from the entropy bit string S3, and bits S4[3] and S4[7] from the entropy bit string S4. However, in some other embodiments, the manipulation entropy string MS1 can be simply derived by selecting one of the entropy bit strings S1 to S6 according to the system requirement.

Also, the operation entropy bit string can be derived by similar manner. Here, for example, the entropy bit string S6 can be selected as the operation entropy bit string. In some embodiments, each bit of the operation entropy bit string can be used to determine whether to perform a corresponding operation to the manipulation bit string MS1.

For example, bit S6[0] of the operation entropy bit string can be used to determine whether to perform a substitution operation to the manipulation entropy string MS1. In some embodiment, if the value of bit S6[0] is "0", then the substitution operation will be performed; if the value of bit S6[0] is "1", then the substitution operation will not be performed. However, the definition of bit S6[0] to enable or to disable the substitution operation may be different in other embodiments. Moreover, the definition of bit S6[0] can be determined by the user or determined by another entropy bit string selected from the entropy bit strings provided by the PUF circuit 110 in some embodiments.

When the substitution operation is performed to the manipulation bit string MS1, at least one bit of the manipulation bit string MS1 is substituted by at least one corresponding bit of a predetermined entropy bit string. For example, the entropy bit string S5 can be selected as the predetermined entropy bit string for the operations required by the operation entropy bit string. In this case, since the value of bit S6[0] is "0", the substitution operation would be performed, and the first bit of the manipulation entropy string MS1 will be substituted by the bit S5 [0] of the entropy bit string S5. Consequently, a substituted entropy string SS1 is generated to have a value of '11011000' as shown in FIG. 4. In some embodiments, more bits can be substituted by the bits of the predetermined entropy bit string according to the system requirement.

Also, bit S6 [1] of the operation entropy bit string can be used to determine whether to perform a transposition operation to the substituted entropy string SS1. In some embodiment, if the value of bit S6[1] is "0", then the transposition operation will not be performed; if the value of bit S6[1] is "1", then the transposition operation will be performed. That is, the definition of the bit S6 [1] for transposition operation can be different from the definition of the bit S6[0] for substitution operation. Also, the definition of the bit S6 [1] to enable or to disable the transposition operation can be different in other embodiments, and can be determined by the user or determined by another entropy bit string selected from the entropy bit strings provided by the PUF circuit 110 in some embodiments.

When the transposition operation is performed to the substituted bit string SS1, at least two bits of the substituted bit string SS1 will be switched. For example, since the value of bit S6 [1] is "1", the transposition operation would be performed, and the positions of each pair of two bits in the manipulation entropy string MS1 will be switched. Consequently, a transposed entropy string TS1 is generated to have a value of "11100100" as shown in FIG. 4. In some embodiments, fewer pairs of bits may be switched according to the system requirement.

In addition, the bit S6 [2] of the operation entropy bit string can be used to determine whether to perform an exclusive OR (XOR) operation to the transposed entropy string TS1. In some embodiment, if the value of bit S6 [2] is "0", then the XOR operation will not be performed; if the value of bit S6[2] is "1", then the XOR operation will be performed. In this embodiment, since the value of bit S6 [2] is "1", the XOR operation will be performed. Also, the definition of the bit S6 [2] to enable or to disable the XOR operation can be different in other embodiments, and can be determined by the user or determined by another entropy bit string provided by the PUF circuit 110 in some embodiments.

When the XOR operation is performed to the transposed bit string TS1, at least one bit of the transposed bit string TS1 is XORed with at least one corresponding bit of the second entropy bit string. In this case, since the entropy bit string S5 has been selected as the predetermined entropy bit string for the operations required by the operation entropy bit string, each bit of the transposed entropy string TS1 will be XORed with the corresponding bit of the entropy bit string S5. Consequently, the security key SK1 is generated to have a value of "01110010" as shown in FIG. 4. In some embodiments, the XOR operation can be performed to only part of the transposed bit string TS1 according to the system requirement.

According to the manipulation processes shown in FIG. 4, the manipulation bit string MS1 has been further randomized by different entropy bit strings, making it even more unclonable and more suitable as a security key SK1. However, in some other embodiments, the operation entropy bit string may include even more bits for determining other different operations. For example, another bit of the operation entropy bit string may be used to determine whether to perform a jump operation, and another bit of the operation entropy bit string may be used to determine whether to perform a reverse operation. The jump operation can move some bits of the manipulation bit string MS1 to other positions for changing the order of the manipulation bit string MS1, and the reverse operation can reverse the whole order of the manipulation bit string MS1.

In some embodiments of the present invention, more different operations may be applied to manipulate the manipulation bit string MS1 for generating the security key SK1. Also, the aforementioned operations may be performed separately or may be combined in any desired order according to the system requirement.

Due to the fact that the PUF bit strings exist in different chips with PUF circuits 110 are unique, the configuration will also be very different in security key generator 120 due to the different PUF bit strings. That means, in each SoC chip with a security system 100, the security key generator 120 of the security system 100 will generate unique security keys for each SoC chip. This feature can be very important in security protections against the security vulnerabilities, and it will result in difficulties in cracking the PUF implementation 100 since each chip has its unique key generation. Even if the hacker can try to break one chip successfully, it will still cost a lot of efforts to break another chip due to the security configuration is different in these two chips. This is also the critical security value with PUF based security system, to raise the barrier for hacking.

In FIG. 1, the security system 100 further comprises a protection circuit 130. The protection circuit 130 can detect system threats and system attacks. For example, the protection circuit 130 may monitor the power condition of the system. Since some of the side channel attacks may input high voltage to the system for disturbing the system and trying to disable the security procedure, this kind of attacks can be detected by monitoring the power behavior. In this case, the protection circuit 130 can transmit a warning signal when an abnormal power behavior occurs, that is, when a system threat or a system attack is detected, the security system 100 would derive a new manipulation bit string MS1 from the plurality of entropy bit strings provided by the PUF circuit 110. Consequently, the security key SK1 previously used would be replaced, making the hacking process even more difficult.

In some embodiments, the manipulation bit string MS1 can be derived from the entropy bit strings periodically. That is, the security key SK1 can be updated periodically so the decryption time available for the hacker would be strictly limited, raising the barrier for reverse engineering.

Figure 5:
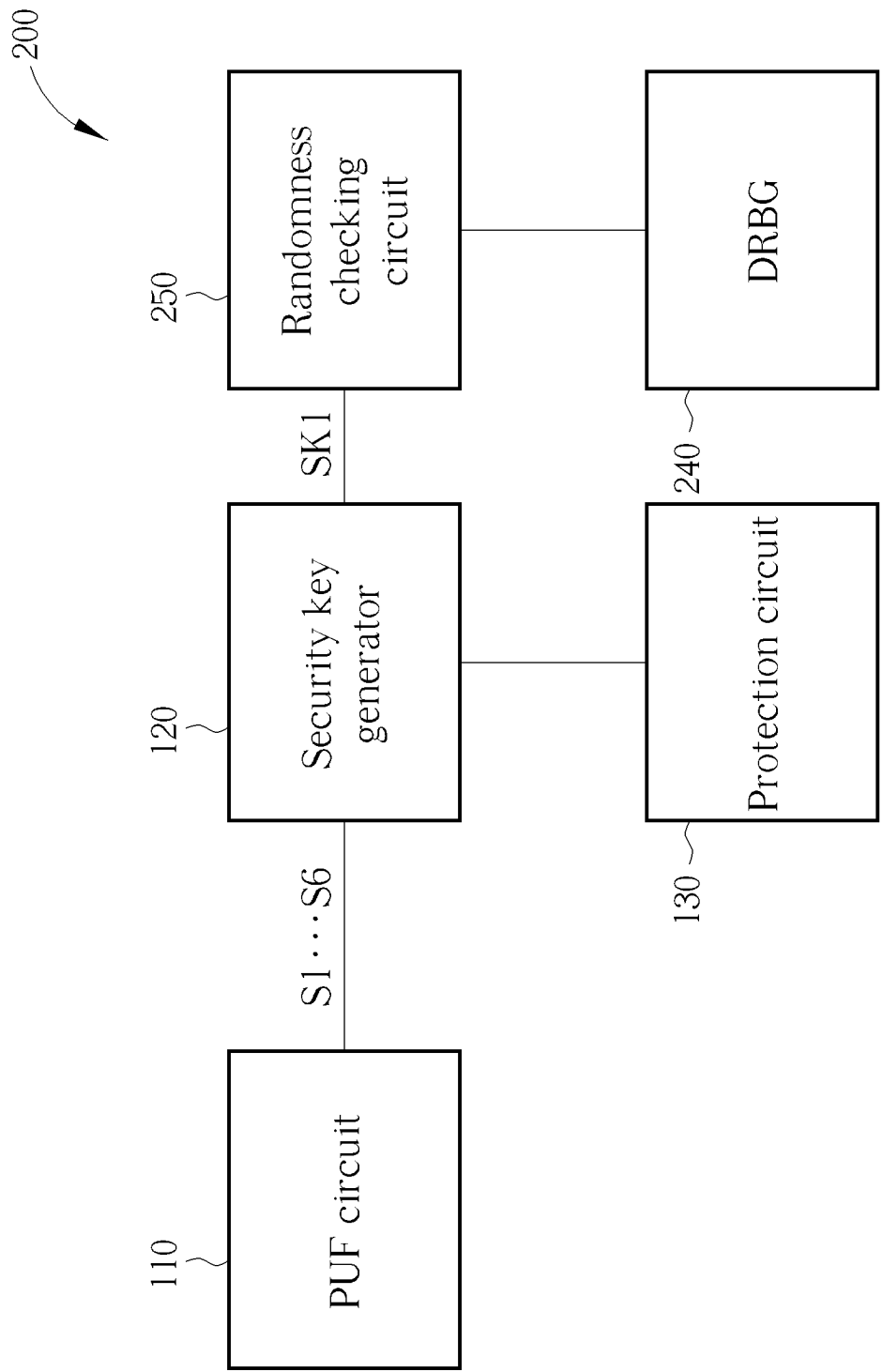
FIG. 5 shows a security system according to another embodiment of the present invention.

Although the entropy bit string derived from the PUF circuit 110 may be used as a random number string due to its intrinsic characteristics, the PUF circuit 110 may not be able to provide the unlimited random numbers required by the system due to the limitation of cost, area and speed. In this case, the security key SK1 generated in the previous embodiment can be used by a deterministic random bit generator as a seed to generate tremendous amount of random number strings in a very short time. FIG. 5 shows a security system 200 according to another embodiment of the present invention. The security systems 100 and 200 have similar structures; however, the security system 200 further includes a deterministic random bit generator (DRBG) 240.

The deterministic random bit generator 240 can generate a random number string with at least one deterministic formula by using the security key SK1 generated by the security key generator 120 as a seed of parameters. The formulas used by the deterministic random bit generator 240 maybe based on known algorithms. Since the security key SK1 generated by the security key generator 120 is unique and unpredictable, the random number string generated by the deterministic random bit generator 240 would also be unique and difficult to predict. Moreover, since the random number string is generated by the deterministic random bit generator 240 with a deterministic formula, the generation of the random numbers will be unlimited, the generation speed can be very fast and the number of strings can be controlled easily to meet the system requirement. In some embodiments, the random number string can be used for system initialization as initialization vectors, paddings or can be used by cryptographic applications such as RSA encryption, Advanced Encryption Standard (AES) encryption, Data Encryption Standard (DES) encryption, and Elliptic curve cryptography (ECC).

In addition, since the entropy bit strings provided by the PUF circuit 110 are unpredictable, chances are that the security key SK1 generated by the security key generator may have many repeated bits, for example, most of the bits may be "1" or "0". In this case, if the security key SK1 is used by the deterministic random bit generator 240 directly, then the random number strings generated by the deterministic random bit generator 240 may become easier to be predicted. Therefore, in FIG. 5, the security system 200 can further include a randomness checking circuit 250. The randomness checking circuit 250 can check the randomness of the security key SK1 with statistical methods, such as mono bit test, poker test, runs test, etc. If any of the randomness tests fails, or if the security key SK1 is identified as not being random enough, then the security key SK1 would be processed by performing at least one logic computation, such as a hash operation, XOR operations, etc., for generating the parameters used by the deterministic random bit generator 240. Therefore, the quality of the random number strings generated by the deterministic random bit generator 240 can be ensured.

In FIG. 5, the randomness checking circuit 250 is seemed to be distinct from the protection circuit 130, however, in some embodiments, the randomness checking circuit 250 may be included in the protection circuit 130. That is, the function blocks shown in FIGS. 1 and 5 are used to present their functions and are not to limit their physical implementation. For example, in some embodiments, the PUF circuit 110 and the security key generator 120 can also be integrated into the protection circuit 130 according to the system requirement.

Also, in some embodiments, the logic computation can always be applied to the security key SK1 without being tested by the randomness checking circuit 250 according to the system requirement. Furthermore, in some embodiments, the security key SK1 can be regenerated periodically or regenerated when a system threat or a system attack is detected by the protection circuit 130 for ensuring the quality of encryption. Furthermore, in some embodiments, the formula used by the deterministic random number generator 240 can also be updated according to the system requirement, making the protection even more solid.

Also, in some embodiments, the deterministic random number generator 240 may use the entropy bit string provided by the PUF circuit 110 as the parameters for generating the random number strings without manipulations of the security key generator 120. In this case, the randomness of the entropy bit string can still be tested by the randomness checking circuit 250, and the necessary logic computation can be applied to ensure the quality of the parameters.

Figure 6:
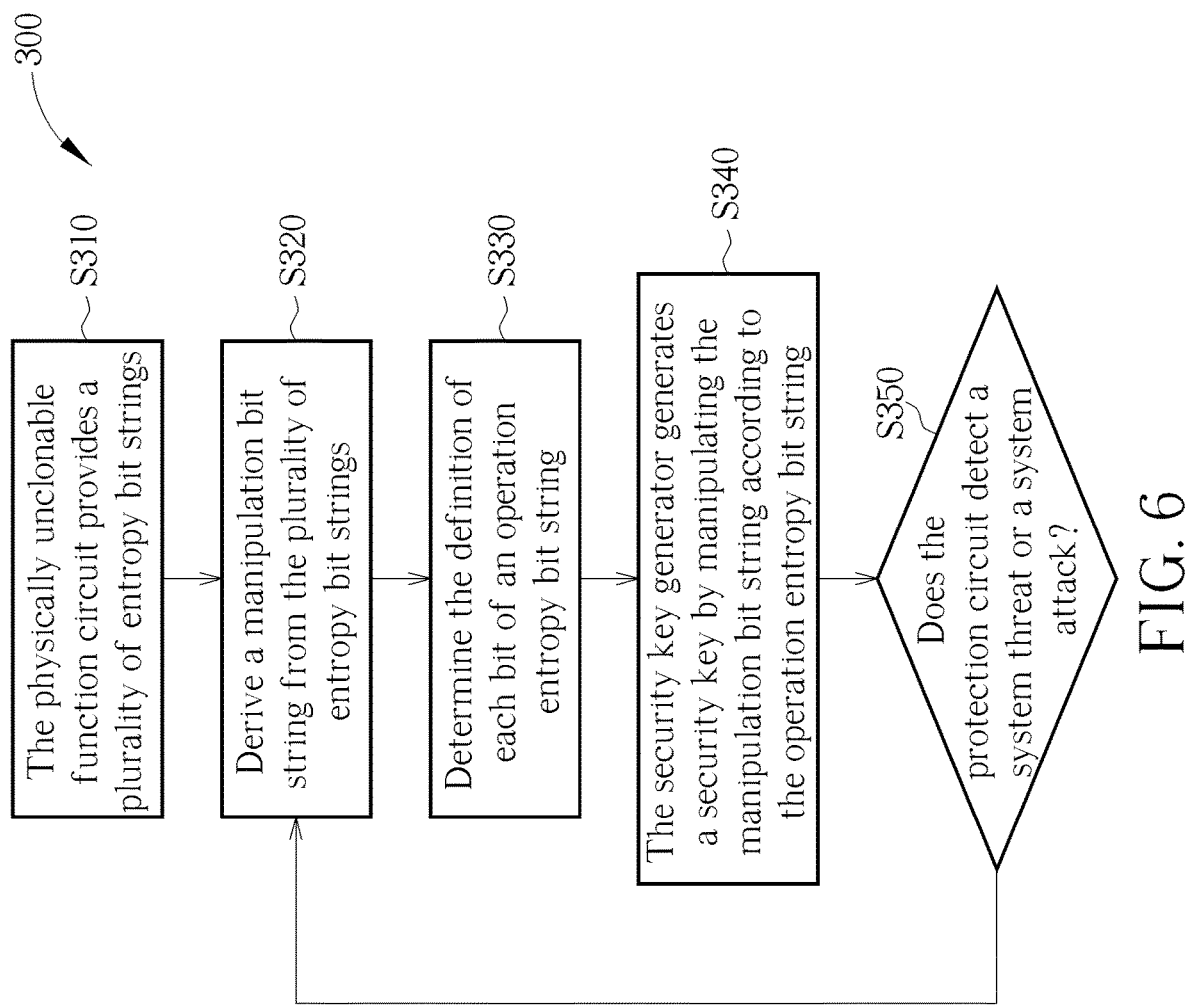
FIG. 6 shows a flowchart of a method for operating the security system in FIG. 1 according to another embodiment of the present invention.

FIG. 6 shows a method 300 for operating the security system 100. The method 300 includes steps S310 to S350, but is not limited to the order shown in FIG. 6.

S310: the physically unclonable function circuit 110 provides a plurality of entropy bit strings;

S320: derive a manipulation bit string MS1 from the plurality of entropy bit strings;

S330: determine the definition of each bit of an operation entropy bit string;

S340: the security key generator 120 generates a security key SK1 by manipulating the manipulation bit string MS1 according to the operation entropy bit string; and S350: when the protection circuit 130 detects a system threat or a system attack, go to step S320.

In step S310, the PUFs can provide a plurality of entropy bit strings such as the entropy bit strings S1 to S6 shown in FIG. 3, and the manipulation bit string MS1 can be derived from the entropy bit strings provided by the PUFs in step S320. For example, the manipulation bit string MS1 can be derived by bits of different entropy strings S1 to S4 as shown in FIG. 4 or can be derived by simply selecting one of the entropy strings provided by the PUF circuit 110.

After the manipulation bit string MS1 is derived, the security key generator 120 can manipulate the manipulation bit string MS1 with an operation entropy bit string. Each bit of the operation entropy bit string can be used to determine whether to perform a corresponding operation, such as substitution operation, XOR operation, transposition operation, jump operation, reverse operation, etc., to the manipulation bit string MS1. In the present embodiment, the definition of each bit of the operation entropy bit string can be determined in step S330, and the security key generator 120 would generate the security key SK1 by manipulating the manipulation bit string MS1 according to the operation entropy bit string in step S340.

In some embodiments, the operations performed by the security key generator 120 may involve other entropy bit strings, such as the XOR operation and the substitution operation. In this case, a predetermined entropy bit string may be selected from the entropy bit strings provided by the PUF circuit 110 for the corresponding operations. Also, in some embodiments, the definition of each bit of the operation entropy bit string can be determined according to another entropy bit string selected from the entropy bit strings provided by the PUF circuit 110. Consequently, the security key SK1 generated by the security system 100 would be complicate enough to protect itself from reverse engineering threats or side channel attacks.

Furthermore, to prevent the security key SK1 from being decoded, the security system 100 can derive the manipulation bit string MS1 from the plurality of entropy bit strings again in step S350 when the protection circuit 130 detects a system threat or a system attack.

Figure 7:
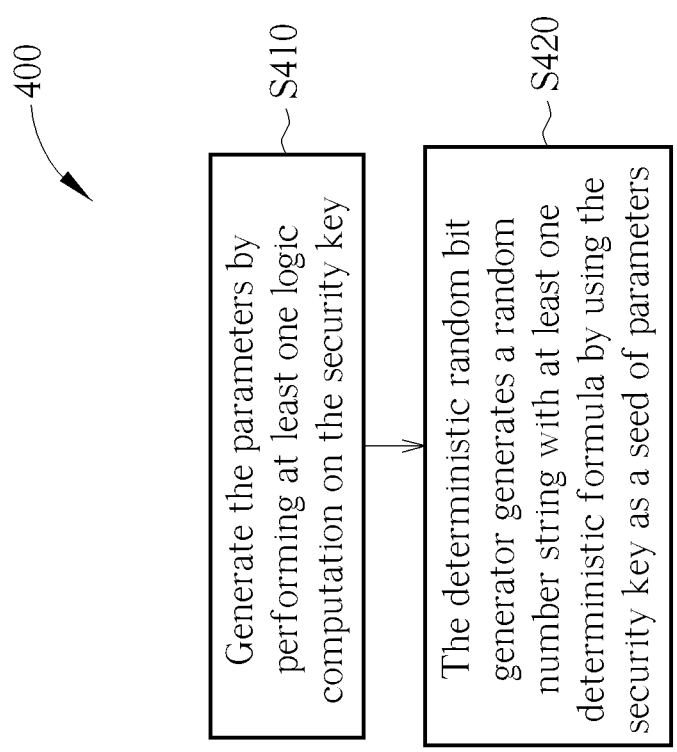
FIG. 7 shows a flowchart of a method for operating the security system in FIG. 5 according to another embodiment of the present invention.

FIG. 7 shows a method 400 for operating the security system 200. The method 400 includes steps S410 to S420, but is not limited to the order shown in FIG. 6.

S410: generates the parameters by performing at least one logic computation on the security key SK1; and S420: the deterministic random bit generator 240 generates a random number string with at least one deterministic formula by using the security key SK1 as a seed of parameters.

In step S410, the parameters used by the deterministic random bit generator 240 can be generated by performing logic computations on the security key SK1 generated by the security key generator 120 previously to ensure randomness. In some embodiments, step S410 can be performed only when the randomness checking circuit 250 determines that the security key SK1 is not random enough. However, in some other embodiments, the step S410 can be performed as a routine procedure.

After the parameters are determined, the deterministic random bit generator 240 can generate the random number string by using at least one deterministic formula with the parameters in step S420. Consequently, with limited number of entropy bit strings provided by the PUF circuit 110, the security system is able to generate unlimited amount of random number strings in a short time to meet the requirement of the cryptography applications.

In addition, in some embodiments, the security key SK1 can be regenerated periodically or when a system threat or a system attack is detected by the protection circuit so that the random number strings can be updated. In some other embodiments, the formula used by the deterministic random bit generator 240 may also be updated according to the system requirement.

In summary, the security system and the method for operating the security system provided by the embodiments of the present invention can generate unpredictable security keys with PUFs to enhance system security. Also, with the security keys or the entropy bits provided by the PUFs, a tremendous random number string can be generated with a deterministic random number generator, allowing the unclonable characteristic of PUFs to be used by all kinds of cryptographic applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A security system with entropy bits comprising:
    a physically unclonable function (PUF) circuit configured to provide a plurality of entropy bit strings; and
    a security key generator configured to generate a security key by manipulating a manipulation bit string derived from the plurality of entropy bit strings according to an operation entropy bit string;
    wherein each bit of the operation entropy bit string is configured to determine whether to perform a corresponding operation to the manipulation bit string.

2. The security system with entropy bits of claim 1, wherein:
    a bit of the operation entropy bit string is configured to determine whether to perform a substitution operation to the manipulation entropy string; and
    when the substitution operation is performed to the manipulation bit string, at least one bit of the manipulation bit string is substituted by at least one corresponding bit of a predetermined entropy bit string of the plurality of entropy bit strings.

3. The security system with entropy bits of claim 1, wherein:
    a bit of the operation entropy bit string is configured to determine whether to perform an exclusive OR (XOR) operation to the manipulation entropy string; and
    when the XOR operation is performed to the manipulation bit string, at least one bit of the manipulation bit string is XORed with at least one corresponding bit of a predetermined entropy bit string of the plurality of entropy bit strings.

4. The security system with entropy bits of claim 1, wherein:
    a bit of the operation entropy bit string is configured to determine whether to perform a transposition operation; and
    when the transposition operation is performed to the manipulation bit string, at least two bits of the manipulation bit string are switched.

5. The security system with entropy bits of claim 1, wherein:
    a bit of the operation entropy bit string is configured to determine whether to perform a jump operation or a reverse operation.

6. The security system with entropy bits of claim 1, wherein the manipulation bit string is derived from bits of different entropy strings of the plurality of entropy bit strings according to a predetermined order.

7. The security system with entropy bits of claim 1 further comprising a protection circuit configured to detect system threats and system attacks;
    wherein the manipulation bit string is derived from the plurality of entropy bit strings again when a system threat or a system attack is detected.

8. The security system with entropy bits of claim 1, wherein the manipulation bit string is derived from the plurality of entropy bit strings periodically.

9. The security system with entropy bits of claim 1, wherein definition of each bit of the operation entropy bit string is determined by a selected entropy bit string of the plurality of entropy bit strings.

10. The security system with entropy bits of claim 1 further comprising a deterministic random bit generator (DRBG) configured to generate a random number string with at least one deterministic formula by using the security key as a seed of parameters.

11. The security system with entropy bits of claim 10, wherein the random number string is used by initialization vectors, paddings, numbers used once (nonce) and cryptography applications.

12. The security system with entropy bits of claim 10, wherein the parameters are generated by performing at least one logic computation on the security key.

13. The security system with entropy bits of claim 10 further comprising a randomness checking circuit for checking randomness of the security key;
    wherein the parameters are generated by performing at least one logic computation on the security key when the randomness of the security key is determined to be not enough according to statistical tests performed by the randomness checking circuit.

14. The security system with entropy bits of claim 10 further comprising a protection circuit configured to detect system threats and system attacks;
    wherein the security key is regenerated when a system threat or a system attack is detected.

15. The security system with entropy bits of claim 10, wherein the security key is regenerated periodically.

16. The security system with entropy bits of claim 1, wherein the PUF circuit comprises a plurality of PUF units, each comprising:
    a first one-time programmable (OTP) memory cell comprising:
        a first antifuse transistor having a first terminal coupled to a bit line, a second terminal, and a gate structure, wherein a portion of the gate structure adjacent to the first terminal of the first antifuse transistor has thicker gate oxide than a portion of the gate structure adjacent to the second terminal of the first antifuse transistor; and a second OTP memory cell comprising:
  a second antifuse transistor having a first terminal coupled to the bit line, a second terminal coupled to the second terminal of the first antifuse transistor, and a gate structure, wherein a portion of the gate structure adjacent to the first terminal of the second antifuse transistor has thicker gate oxide than a portion of the gate structure adjacent to the second terminal of the second antifuse transistor;
wherein a program operation is performed to the first OTP memory cell and the second OTP memory cell concurrently while only one of the first OTP memory cell and the second OTP memory cell is programmed according to manufacturing variations of the first OTP memory cell and the second OTP memory cell.

17. The security system with entropy bits of claim 1, wherein the PUF circuit comprises a plurality of PUF units, each comprising:
  a first one-time programmable (OTP) memory cell comprising:
    a first selection transistor having a first terminal coupled to a bit line, a second terminal, and a control terminal coupled to a word line; and
    a first antifuse transistor having a first terminal coupled to the second terminal of the first selection transistor, a second terminal, and a gate structure; and
  a second OTP memory cell comprising:
    a second selection transistor having a first terminal coupled to the bit line, a second terminal, and a control terminal coupled to the word line;
    a second antifuse transistor having a first terminal coupled to the second terminal of the second selection transistor, a second terminal coupled to the second terminal of the first antifuse transistor, and a gate structure;
  wherein a program operation is performed to the first OTP memory cell and the second OTP memory cell concurrently while only one of the first OTP memory cell and the second OTP memory cell is programmed according to manufacturing variations of the first OTP memory cell and the second OTP memory cell.

18. The security system with entropy bits of claim 1, wherein the PUF circuit comprises a plurality of PUF units, each comprising:
  a first one-time programmable (OTP) memory cell comprising:
    a first selection transistor having a first terminal coupled to a bit line, a second terminal, and a control terminal coupled to a word line;
    a first decoupling transistor having a first terminal coupled to the second terminal of the first selection transistor, a second terminal, and a control terminal coupled to a control line; and
    a first antifuse transistor having a first terminal coupled to the second terminal of the first decoupling transistor, a second terminal, and a gate structure; and
  a second OTP memory cell comprising:
    a second selection transistor having a first terminal coupled to the bit line, a second terminal, and a control terminal coupled to the word line;
    a second decoupling transistor having a first terminal coupled to the second terminal of the second selection transistor, a second terminal, and a control terminal coupled to the control line; and
    a second antifuse transistor having a first terminal coupled to the second terminal of the second decoupling transistor, a second terminal coupled to the second terminal of the first antifuse transistor, and a gate structure;
  wherein a program operation is performed to the first OTP memory cell and the second OTP memory cell concurrently while only one of the first OTP memory cell and the second OTP memory cell is programmed according to manufacturing variations of the first OTP memory cell and the second OTP memory cell.

19. A method for operating a security system with entropy bits, the security system comprising a physically unclonable function (PUF) circuit and a security key generator, and the method comprising:
  the physically unclonable function circuit providing a plurality of entropy bit strings;
  deriving a manipulation bit string from the plurality of entropy bit strings; and
  the security key generator generating a security key by manipulating the manipulation bit string according to an operation entropy bit string;
  wherein each bit of the operation entropy bit string is configured to determine whether to perform a corresponding operation to the manipulation bit string.

20. The method of claim 19, wherein the security key generator generating the security key by manipulating the manipulation bit string according to the operation entropy bit string comprises:
  the security key generator performing a substitution operation to the manipulation entropy string according to a bit of the operation entropy bit string;
  wherein when the substitution operation is performed to the manipulation bit string, at least one bit of the manipulation bit string is substituted by at least one corresponding bit of a predetermined entropy bit string of the plurality of entropy bit strings.

21. The method of claim 19, wherein the security key generator generating the security key by manipulating the manipulation bit string according to the operation entropy bit string comprises:
  the security key generator performing an exclusive OR (XOR) operation to the manipulation entropy string according to a bit of the operation entropy bit string;
  wherein when the XOR operation is performed to the manipulation bit string, at least one bit of the manipulation bit string is XORed with at least one corresponding bit of a predetermined entropy bit string of the plurality of entropy bit strings.

22. The method of claim 19, wherein the security key generator generating the security key by manipulating the manipulation bit string according to the operation entropy bit string comprises:
  the security key generator performing a transposition operation to the manipulation entropy string according to a bit of the operation entropy bit string;
  wherein when the transposition operation is performed to the manipulation bit string, at least two bits of the manipulation bit string are switched.

23. The method of claim 19, wherein the security key generator generating the security key by manipulating the manipulation bit string according to the operation entropy bit string comprises:
  the security key generator performing a jump operation or a reverse operation to the manipulation entropy string according to a bit of the operation entropy bit string.

24. The method of claim 19, wherein the manipulation bit string is derived from bits of different entropy strings of the plurality of entropy bit strings according to a predetermined order.

25. The method of claim 19, wherein the security system further comprises a protection circuit, and the method further comprises:
   when the protection circuit detects a system threat or a system attack, derive the manipulation bit string from the plurality of entropy bit strings again.

26. The method of claim 19, wherein the manipulation bit string is derived from the plurality of entropy bit strings periodically.

27. The method of claim 19 further comprising determining definition of each bit of the operation entropy bit string by a selected entropy bit string of the plurality of entropy bit strings.

28. The method of claim 19, wherein the security system further comprises a deterministic random bit generator (DRBG), and the method further comprises:
   the deterministic random bit generator generating a random number string with at least one deterministic formula by using the security key as a seed of parameters.

29. The method of claim 28, wherein the random number string is used by initialization vectors and cryptography applications.

30. The method of claim 28 further comprising generating the parameters by performing at least one logical computation on the security key.

31. The method of claim 28, wherein the security system further comprises a randomness checking circuit, and the method further comprising:
   generating the parameters by performing at least one logical computation on the security key when the randomness checking circuit determines that randomness of the security key is not enough according to statistical tests performed by the randomness checking circuit.

32. The method of claim 28, wherein the security system further comprises a protection circuit, and the method further comprises:
   regenerating the security key when a system threat or a system attack is detected by the protection circuit.

33. The method of claim 28, wherein the security key is regenerated periodically.

* * * * *